(12) United States Patent
Wu

(10) Patent No.: US 8,905,652 B2
(45) Date of Patent: Dec. 9, 2014

(54) CIRCUIT BOARD ASSEMBLY HAVING OPTICAL CONNECTORS FOR SIGNAL TRANSMISSION

(75) Inventor: Kai-Wen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 156 days.

(21) Appl. No.: 13/592,359

(22) Filed: Aug. 23, 2012

(65) Prior Publication Data

US 2013/0287344 A1 Oct. 31, 2013

(30) Foreign Application Priority Data

Apr. 25, 2012 (TW) .............................. 101114807 A

(51) Int. Cl.
*G02B 6/36* (2006.01)
(52) U.S. Cl.
USPC .......................................................... 385/89
(58) Field of Classification Search
USPC .......................................................... 385/89
See application file for complete search history.

(56) References Cited

U.S. PATENT DOCUMENTS

| 6,393,184 B1* | 5/2002 | Day et al. ......................... 385/49 |
| 2005/0220427 A1* | 10/2005 | Therisod ......................... 385/92 |
| 2007/0140627 A1* | 6/2007 | Lu .................................... 385/89 |
| 2008/0170819 A1* | 7/2008 | Kodama et al. ................. 385/14 |
| 2010/0266258 A1* | 10/2010 | Shibata et al. ................ 385/141 |

* cited by examiner

*Primary Examiner* — Jerry Blevins
(74) *Attorney, Agent, or Firm* — Novak Druce Connolly Bove + Quigg LLP

(57) ABSTRACT

A circuit board assembly includes a substrate, a first optical connector, a second optical connector, and at least two planar light wave circuits. The first optical connector includes a first circuit board electrically connected to the substrate, at least one first laser diode, at least one first photodiode, and a first transparent shell. The second optical connector includes a second circuit board connected to the substrate, at least one second laser diode, at least one second photodiode, and a second transparent shell. The planar light wave circuits are arranged between the first and second transparent shells. Each first laser diode is optically coupled with a second photodiode through a first transparent shell, a planar light wave circuit, and a second transparent shell. Each second laser diode is optically coupled with a first photodiode through a second transparent shell, a planar light wave circuit, and a first transparent shell.

5 Claims, 3 Drawing Sheets

CIRCUIT BOARD ASSEMBLY HAVING OPTICAL CONNECTORS FOR SIGNAL TRANSMISSION

BACKGROUND

1. Technical Field

The present disclosure relates to circuit board assemblies and, particularly, to a circuit board assembly having optical connectors for signal transmission.

2. Description of Related Art

By utilizing optical connectors, signal transmission speed between two electronic devices has being significantly increased. However, before being emitted or after being received by the optical connectors, signals are typically in a form of electric signal in the electronic devices. Electromagnet interference (EMI) may adversely affect a transmission speed of the electric signal, reducing an entire transmission speed between the electronic devices.

Therefore, it is desirable to provide a circuit board assembly, which can overcome the abovementioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
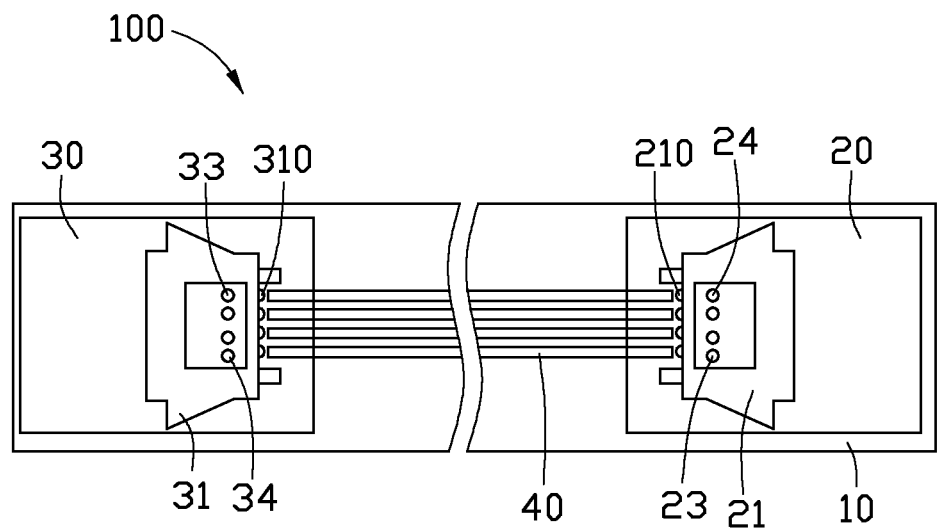
FIG. 1 is an assembled view of a circuit board assembly according to an exemplary embodiment, which is viewed from a top plan angle.
Figure 2:
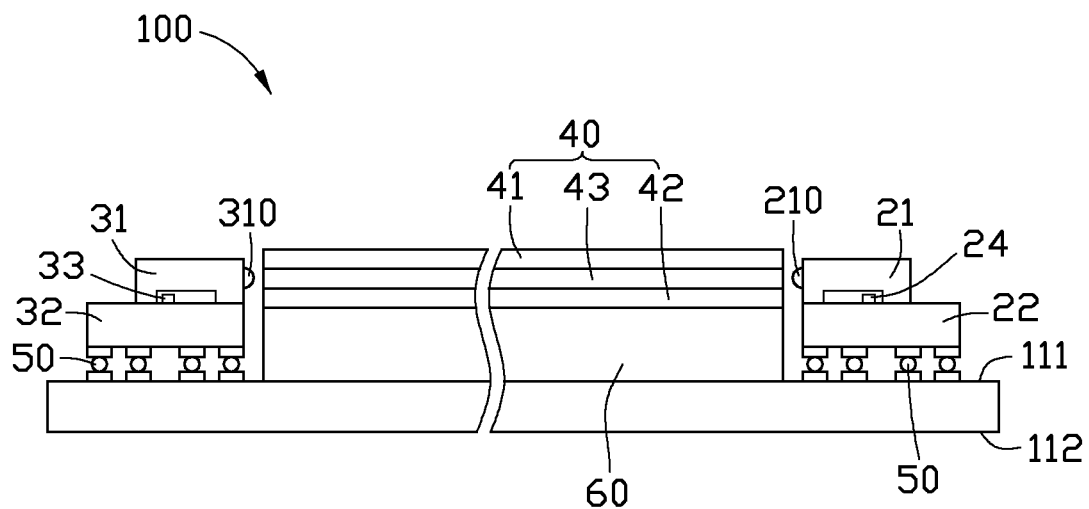
FIG. 2 is a schematic side view of the circuit board assembly of FIG. 1.
Figure 3:
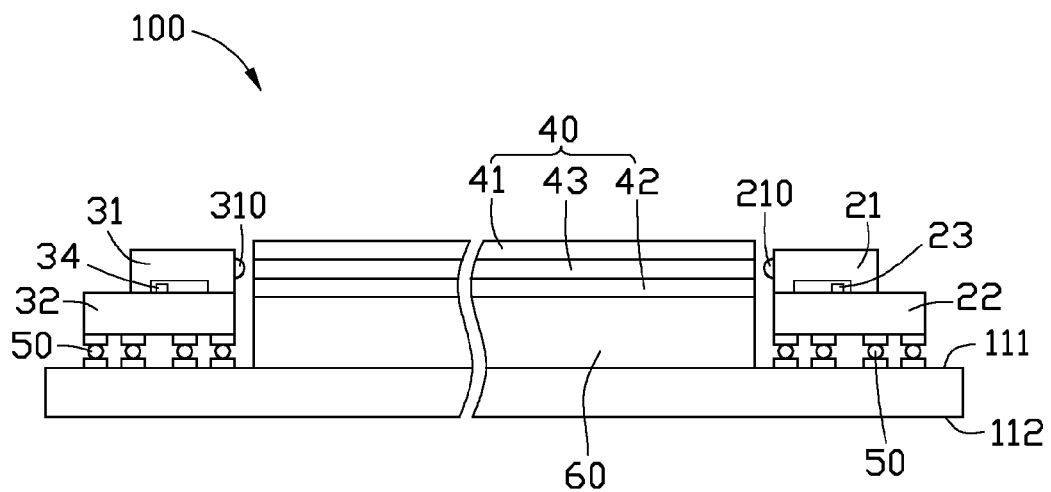
FIG. 3 is another schematic side view of the circuit board assembly of FIG. 1.

Referring to FIGS. 1 to 3, a circuit board assembly 100 according to an exemplary embodiment is shown. The circuit board assembly 100 includes a substrate 10, a first optical connector 20, a second optical connector 30, and a number of planar light wave circuits 40.

The substrate 10 can be a rigid printed circuit board or a flexible printed circuit board. In the embodiment, the substrate 10 is a rigid printed circuit board. The substrate 10 includes a top surface 111 and a bottom surface 112 opposite to the top surface 111.

The first optical connector 20 includes a first transparent shell 21, a first circuit board 22, a number of first laser diodes 23, and a number of first photodiodes 24.

The first transparent shell 21 is mounted on the first circuit board 22 and includes a number of first lenses 210. The number of the first lenses 210 is equal to a sum of the numbers of the first laser diodes 23 and the first photodiodes 24. In the embodiment, the number of the first lenses 210 is four. The number of each of the first laser diodes 23 and the first photodiodes 24 is two. The first circuit board 22 is soldered to the top surface 111 and electrically connected to the substrate 10 through a ball grid array (BGA) 50. The first laser diodes 23 and the first photodiodes 24 are both mounted on the same surface of the first circuit board 22 away from the substrate 10 through a chip on board (COB) technology.

Each first laser diode 23 is optically coupled with a respective first lens 210. Each first laser diode is electrically connected to the first circuit board 22 and used to emit light beams. Each first photodiode 24 is also optically coupled with a respective first lens 210. Each first photodiode 24 is electrically connected to the first circuit board 22 and is used to convert light beams to electric signals.

The second optical connector 30 is similar to the first optical connector 20 and includes a second transparent shell 31, a second circuit board 32, a number of second laser diodes 33, and a number of second photodiodes 34.

The second transparent shell 31 is mounted on the second circuit board 32 and includes a number of second lenses 310. The number of the second lenses 310 is equal to a sum of the numbers of the second laser diodes 33 and the second photodiodes 34. In the embodiment, the number of the second lenses 310 is four. The number of each of the second laser diodes 33 and the first photodiodes 34 is two. The second circuit board 32 is also soldered to the top surface 111 and electrically connected to the substrate 10 through another BGA 50. The second laser diodes 33 and the second photodiodes 34 are both mounted on the same surface of the second circuit board 32 away from the substrate 10 through the COB technology.

Each second laser diode 33 is optically coupled with a respective second lens 310. Each second laser diode 33 is electrically connected the second circuit board 32 and is used to emit light beams. Each second photodiode 34 is also optically coupled with a respective second lens 310. Each second photodiode 34 is electrically connected to the second circuit board 32 and is used to convert light beams to electrical signals.

The planar light wave circuits 40 are positioned on the substrate 10 by a planar light wave circuit (PLC) technology and arranged between and optically coupled with the first transparent shell 21 and the second transparent shell 31. Each planar light wave circuit 40 includes an upper layer 41, a lower layer 42, and a medium layer 43. The medium layer 43 is sandwiched and protected by the upper layer 41 and the lower layer 42 and is used to transmit light beams. In the embodiment, the circuit board assembly 100 further includes a padding layer 60 formed between the planar light wave circuits 40 and the substrate 10. The padding layer 60 can be made of resin and is formed on the top surface 111. The lower layer 43 is formed on padding layer 40. A thickness of the lower layer 42 is the same as a thickness of the upper layer 41.

In the embodiment, the number of the planar light wave circuits 40 is four. Two end surfaces of the medium layer 43 of each planar light wave circuit 40 face a first lens 210 and a second lens 310, respectively. A central axis of the medium layer 43 of each planar light wave circuit 40 is aligned with central axes of a first lens 210 and a second lens 310. Each first laser diode 23 is optically coupled with a second photodiode 34 through a first lens 210, a planar light wave circuit 40, and a second lens 310. Each second laser diode 33 is optically coupled with a first photodiode 24 through a second lens 310, a planar light wave circuit 40, and a first lens 210.

In use, when the first optical connector 20 sends first light beams to the second optical connector 30, each first laser diode 23 emits the first light beams. The first light beams emit to the first transparent shell 21, and pass through a respective first lens 210 to be guided into the medium layer 43 of a respective planar light wave circuit 40. Then the first light beams emit to a respective second lens 310, pass through the second transparent shell 31 and finally project to a respective second photodiode 34. The second photodiode 34 converts the first light beams to first electric signals. The first circuit board 22 transmits the first electric signals to the substrate 10.

When the second optical connector 30 sends second light beams to the first optical connector 30, each of the second laser diodes 33 emits second light beams. The second light beams emit to the second transparent shell 31, pass through a respective second lens 310 and then is guided to the medium layer 43 of a respective planar light wave circuit 40. Then the second light beams emit to a respective first lens 210 and pass through the first transparent shell 21 and finally project to a respective first photodiode 24. The first photodiode converter 24 converts the second light beams to second electric signals. The second circuit board 22 transmits the second electric signals to the substrate 10.

The numbers of the first laser diodes 23, the first photodiodes 24, the second laser diodes 33, the second photodiodes 34, and the planar light wave circuits 40 are not limited in this embodiment but can be set depending upon requirements. For example, in other embodiments, only one first laser diode 23 and one first photodiode 24 are employed. Accordingly, one second photodiode 34, one second laser diode 33, and two planar light wave circuits 40 are employed. The first transparent shell 21 includes two first lenses 210. The second transparent shell 31 also includes two second lenses 310.

It will be understood that the above particular embodiments are shown and described by way of illustration only. The principles and the features of the present disclosure may be employed in various and numerous embodiment thereof without departing from the scope of the disclosure as claimed. The abovedescribed embodiments illustrate the possible scope of the disclosure but do not restrict the scope of the disclosure.

What is claimed is:

1. A circuit board assembly, comprising:
a substrate;
a first optical connector comprising:
a first circuit board electrically connected to the substrate;
at least one first laser diode and at least one first photodiode mounted on the first circuit board; and
a first transparent shell mounted on the first circuit board, the first transparent shell comprising at least two first lenses, each of the at least one first laser diode and the at least one first photodiode being optically coupled with a respective one of the at least two first lenses;
a second optical connector comprising:
a second circuit board electrically connected to the substrate;
at least one second laser diode and at least one second photodiode mounted on the second circuit board; and
a second transparent shell mounted on the second circuit board, the second transparent shell comprising at least two second lenses, each of the at least one second laser diode and the at least one second photodiode being optically coupled with a respective one of the at least two second lenses; and
at least two planar light wave circuits positioned on the substrate and arranged between the first transparent shell and the second transparent shell;
wherein each first laser diode is optically coupled with a respective second photodiode through a respective first lens, a respective planar light wave circuit, and a respective second lens; each second laser diode is optically coupled with a respective first photodiode through a respective second lens, a respective planar light wave circuit, and a respective first lens;
wherein each planar light wave circuit comprises a medium layer, an upper layer, and a lower layer; the medium layer is sandwiched and protected by the upper layer and the lower layer; two end surfaces of the medium layer respectively face a respective first lens and a respective second lens;
wherein the first optical connector comprises two first laser diodes and two first photodiodes, the second optical connector comprises two second laser diodes and two second photodiodes, the number of the at least two planar light wave circuits is four;
wherein the first transparent shell comprises four first lenses, and the second transparent shell comprises four second lenses.

2. The circuit board assembly of claim 1, wherein the circuit board assembly further comprises a padding layer between the substrate and the planar light wave circuits.

3. The circuit board assembly of claim 1, wherein a thickness of the lower layer is the same as a thickness of the upper layer.

4. The circuit board assembly of claim 1, wherein the first circuit board and the second circuit board are soldered to the substrate through ball gird arrays.

5. A circuit board assembly, comprising:
a substrate;
a first optical connector comprising:
a first circuit board electrically connected to the substrate;
at least one first laser diode and at least one first photodiode mounted on the first circuit board; and
a first transparent shell mounted on the first circuit board, the first transparent shell comprising at least two first lenses, each of the at least one first laser diode and the at least one first photodiode being optically coupled with a respective one of the at least two first lenses;
a second optical connector comprising:
a second circuit board electrically connected to the substrate;
at least one second laser diode and at least one second photodiode mounted on the second circuit board; and
a second transparent shell mounted on the second circuit board, the second transparent shell comprising at least two second lenses, each of the at least one second laser diode and the at least one second photodiode being optically coupled with a respective one of the at least two second lenses; and
at least two planar light wave circuits positioned on the substrate and arranged between the first transparent shell and the second transparent shell;
wherein each first laser diode is configured for emitting first light beams, the first light beams are transmitted through a respective first lens, a respective planar light wave circuit, a respective second lens, and finally received by a respective second photodiode; each second laser diode is configured for emitting second light beams, the second light beams are transmitted through a respective second lens, a respective planar light wave circuit, a respective first lens, and finally received by a respective first photodiode;
wherein the circuit board assembly further comprises a padding layer positioned between the substrate and the planar light wave circuits;
wherein each planar light wave circuit comprises a medium layer, an upper layer, and a lower layer; the medium layer is sandwiched and protected by the upper layer and the lower layer; two end surfaces of the medium layer face a respective first lens and a respective second lens;

wherein the first optical connector comprises two first laser diodes and two first photodiodes, the second optical connector comprises two second laser diodes and two second photodiodes, the number of the at least two planar light wave circuits is four; and wherein the first transparent shell comprises four first lenses, and the second transparent shell comprises four second lenses.

* * * * *